US008606483B2

(12) United States Patent
Krupadanam et al.

(10) Patent No.: US 8,606,483 B2
(45) Date of Patent: Dec. 10, 2013

(54) ROAD GRADE COORDINATED ENGINE CONTROL SYSTEMS

(75) Inventors: Ashish S. Krupadanam, Rochester Hills, MI (US); Mike M. McDonald, Macomb, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 1155 days.

(21) Appl. No.: 12/539,854

(22) Filed: Aug. 12, 2009

(65) Prior Publication Data

US 2011/0040471 A1 Feb. 17, 2011

(51) Int. Cl.
*G06F 19/00* (2011.01)
*F02D 13/06* (2006.01)
*F02D 17/02* (2006.01)

(52) U.S. Cl.
USPC ........................ 701/101; 701/102; 123/198 F

(58) Field of Classification Search
USPC ....... 701/101, 102, 112; 123/198 F, 325, 332, 123/481
See application file for complete search history.

(56) References Cited

U.S. PATENT DOCUMENTS

| | | | | | |
|---|---|---|---|---|---|
| 4,188,933 | A | * | 2/1980 | Iizuka | 123/198 F |
| 4,694,796 | A | * | 9/1987 | Mori | 123/325 |
| 5,031,715 | A | * | 7/1991 | Ogawa et al. | 180/179 |
| 5,813,383 | A | * | 9/1998 | Cummings | 123/198 F |
| 5,836,291 | A | * | 11/1998 | Kinugasa et al. | 123/679 |
| 7,017,360 | B2 | * | 3/2006 | Kotwicki et al. | 62/133 |
| 7,159,544 | B1 | * | 1/2007 | Studdert et al. | 123/48 B |
| 7,223,204 | B2 | * | 5/2007 | Steen et al. | 477/97 |
| 7,331,172 | B2 | * | 2/2008 | Persson | 60/295 |
| 7,424,868 | B2 | * | 9/2008 | Reckels et al. | 123/41.1 |
| 8,146,565 | B2 | * | 4/2012 | Leone et al. | 123/319 |
| 2007/0282520 | A1 | * | 12/2007 | Cradick et al. | 701/123 |
| 2008/0154468 | A1 | * | 6/2008 | Berger et al. | 701/54 |
| 2010/0010732 | A1 | * | 1/2010 | Hartman | 701/200 |

* cited by examiner

*Primary Examiner* — Mahmoud Gimie
*Assistant Examiner* — David Hamaoui

(57) ABSTRACT

An engine control system of a vehicle includes a road grade module and a predictive control module. The road grade module detects a grade of a road that is ahead of the vehicle. The predictive control module detects that a first cylinder of an engine of the vehicle is deactivated while a second cylinder of the engine is activated. The predictive control module activates the first cylinder based on the grade.

20 Claims, 6 Drawing Sheets

ROAD GRADE COORDINATED ENGINE CONTROL SYSTEMS

FIELD

The present invention relates to control of a motor vehicle and, more particularly, to control of an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Active Fuel Management (AFM) improves fuel economy of a vehicle via deactivation of selected engine cylinders during operation of an internal combustion engine (ICE). For example, an eight-cylinder engine may have four cylinders deactivated during a highway cruising event when engine load and/or requested torque is less than a respective threshold(s). All of the engine's cylinders may be activated to provide a requested engine torque during a state of wide-open-throttle engine operation or during an uphill driving event.

Intake and exhaust valves of a cylinder may be prevented from opening, and maintained in a closed state during cylinder deactivation. An engine cylinder does not produce power when deactivated. Exhaust gas may be retained in the cylinder when the cylinder is deactivated. The retained exhaust gas is iteratively compressed and uncompressed during intake, compression, ignition and exhaust strokes of other active cylinders. The deactivated cylinders provide essentially zero net output torque to a crankshaft of an engine.

An engine cylinder generates torque when activated. The torque is provided to a crankshaft that drives a driveline of a vehicle. A positive torque is generated by the engine cylinder during vehicle acceleration and a negative torque is generated during engine braking. The negative torque may be used to decelerate the vehicle. Engine braking reduces brake-pad wear and prevents brake overheating during sustained braking, such as during a downhill braking event. Engine braking may be used in conjunction with sustained wheel braking during a downhill driving event to maintain a constant vehicle speed.

Minimal engine braking torque is provided by a deactivated cylinder. The more cylinders that are deactivated, the more overall engine braking torque is reduced.

SUMMARY

In one embodiment, an engine control system is provided. The engine control system includes a road grade module and a predictive control module. The road grade module detects a grade of a road that is ahead of the vehicle. The predictive control module detects a first cylinder of an engine of the vehicle that is deactivated. The predictive control module detects a second cylinder of the engine that is activated. The control module activates the first cylinder based on the grade.

In other features, a method of operating an engine control system of a vehicle is provided. The method includes detection of a grade of a road that is ahead of the vehicle. A first cylinder of an engine of the vehicle that is deactivated is detected. A second cylinder of the engine that is activated is detected. The deactivated first cylinder is activated based on the detection of the grade.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
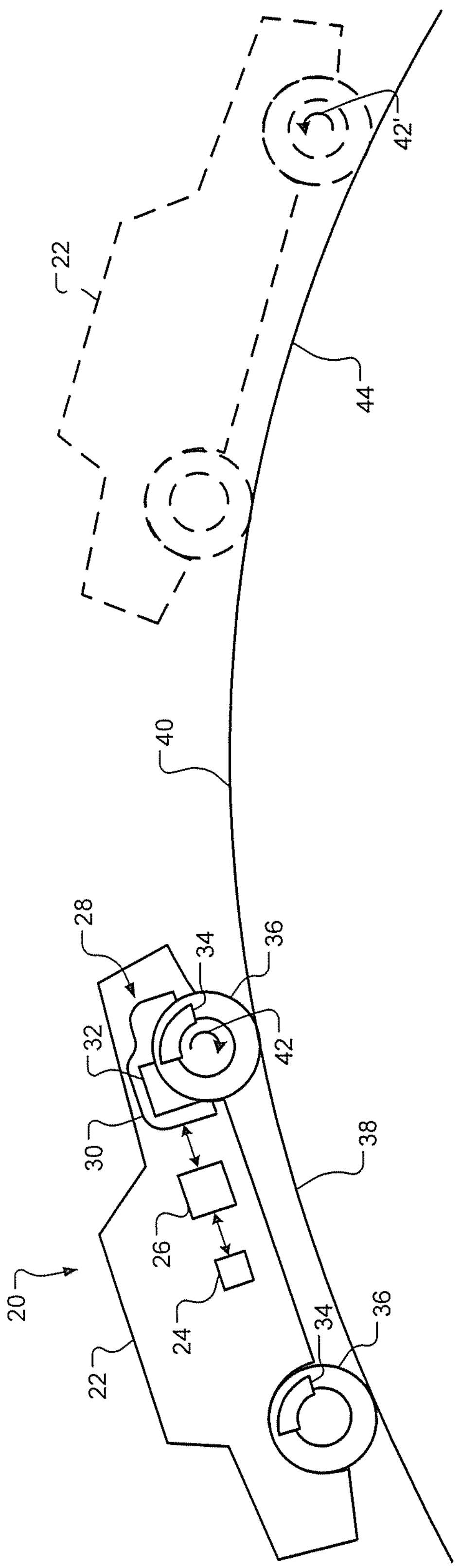
FIG. 1 is a functional block diagram of a vehicle control system operating in an exemplary environment according to an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle control system 20 of a vehicle 22 is shown operating in an exemplary environment. The vehicle control system 20 may include the vehicle 22, a coordination control module 24, a powertrain control module 26 and a powertrain system 28. The powertrain system 28 may include an engine 30 and a transmission 32. The coordination control module 24 communicates with the powertrain control module 26 to control the powertrain system 28. The vehicle also includes brakes 34 that apply brake torque to the wheels 36.

The vehicle 22 is traveling uphill on a terrain 40 at an uphill location 38. Engine torque is delivered to wheels 36 to move the vehicle 22 uphill. A positive wheel torque 42 is delivered to the wheels 36 during this uphill driving event.

When the vehicle 22 travels at a downhill location 44, brakes 34 may be applied to the wheels 36 to maintain a vehicle speed, and to prevent a downhill acceleration of the vehicle. A negative wheel torque 42' may be provided during a downhill driving event. The negative wheel torque 42' may be provided by the brake 34, or jointly provided by the brakes 34 and the engine 30, via engine braking. A reduced amount of engine braking is generated when an AFM mode of operation deactivates cylinders of the engine 30. Reduced engine braking is not desirable during a downhill driving event. The coordination control module 24 may communicate with the powertrain control module 26 to allow or disallow cylinder deactivation of the AFM mode of operation; and therefore influence the engine braking capability during the downhill driving event.

Figure 2:
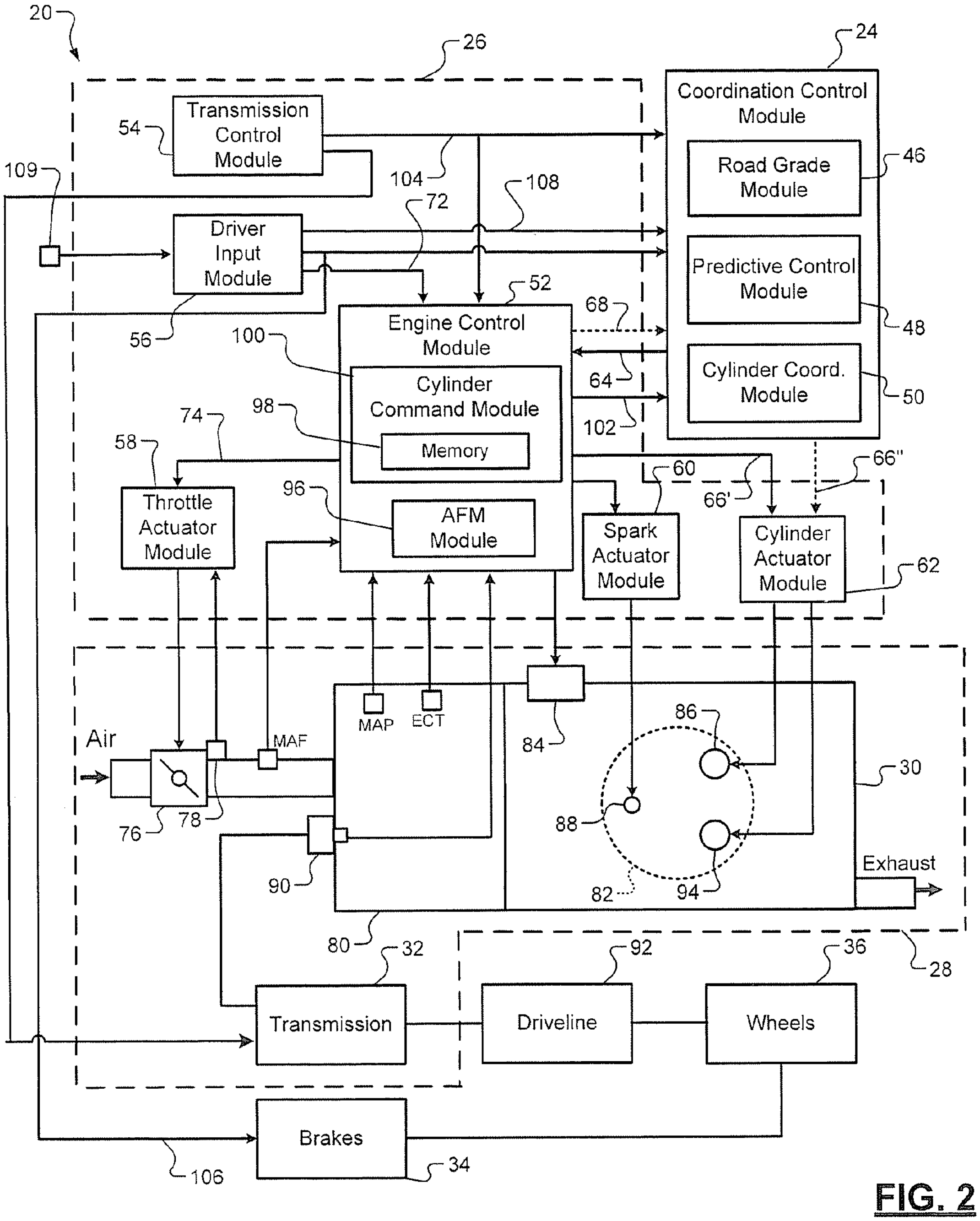
FIG. 2 is a functional block diagram of a vehicle control system with an exemplary road-grade coordinated engine control according to the principles of the present disclosure.

Referring now also to FIG. 2, a functional block diagram of the vehicle control system 20 is shown. The vehicle control system 20 may include the coordination control module 24 and the powertrain control module 26. The coordination control module 24 may include a road grade module 46, a predictive control module 48 and a cylinder coordination module 50. The powertrain control module 26 may include an engine control module (ECM) 52, a transmission control module 54, a driver input module 56, a throttle actuator module 58, a spark actuator module 60 and a cylinder actuator module 62. In one embodiment, the coordination control module 24 is distinct from the ECM 52. In another embodiment, the coordination control module 24 is a part of the ECM 52.

The coordination control module 24 may receive signals from the ECM 52, the transmission control module 54 and the driver input module 56. The road grade module 46 detects a road grade ahead of a current geographic position of the vehicle 22. The predictive control module 48 detects deactivation of selected cylinder(s) of the engine. The predictive control module 48 generates a cylinder re-activation signal to re-activate the cylinder(s) based on the detected road grade when the cylinder is deactivated.

In one embodiment, the coordination control module 24 generates a cylinder re-activation request signal 64 to the ECM 52. The re-activation request signal 64 requests the ECM 52 to disable a control of cylinder deactivation due to AFM so that the cylinder may be activated. In response, the ECM 52 may generate an updated cylinder deactivation signal 66' for the cylinder actuator module 62 based on the re-activation request signal 64.

In another embodiment, the coordination control module 24 may receive an AFM cylinder signal 68 from the ECM. The ECM 52 may generate the AFM cylinder signal 68 based on the AFM control. The AFM cylinder signal 68 may include commands for deactivating selected cylinders. The coordination control module 24 may generate an updated cylinder deactivation signal 66" to override the AFM cylinder signal 68. The coordination control module 24 may send the updated cylinder deactivation signal 66" to the cylinder actuator module 62.

In the powertain control module 26, the ECM 52 may generate various engine control command signals for engine operation. The ECM 52 receives an accelerator pedal signal 72 from the driver input module 56, and generates a throttle command signal 74. The throttle actuator module 58 performs closed-loop control and opens a throttle 76 based on the throttle command signal 74 and a throttle position signal from a throttle position sensor 78. The engine 30 may include an intake manifold 80. Air may enter the intake manifold 80 through the throttle 76. The ECM 52 may also perform engine control based on sensor signals from a mass air flow sensor MAF, an engine coolant temperature sensor ECT and a manifold atmospheric pressure sensor MAP.

The engine 30 may include any number of cylinders. For illustration purposes only, a single representative cylinder 82 is shown. The ECM 52 may also generate a fuel command signal to deliver a determined amount of fuel to the engine 30 via a fuel actuator 84. The fuel actuator 84 may be a fuel injector. The injected fuel may be mixed with the air to form an air-fuel mixture. The air/fuel mixture may enter the engine cylinder 82 through an intake valve 86. The spark actuator module 60 generates and sends a spark command signal to a spark plug 88 that ignites the air/fuel mixture to produce power during an ignition stroke. Torque is delivered to a crankshaft 90 which further drives the transmission 32 and a driveline 92. After the ignition stroke, exhaust gas is removed from the cylinder 82 through an exhaust valve 94 and further removed from the engine 30 through an exhaust system.

The ECM 52 may include an AFM module 96 that performs Active Fuel Management tasks. The AFM module 96 may generate an AFM status to indicate a status of the AFM system. The AFM status may be one of ACTIVE and INACTIVE to indicate that the AFM system is active or inactive, respectively. The cylinder command module 100 may determine control commands to activate or deactivate engine cylinders based on the AFM status. The AFM status may be stored in a memory 98 in the cylinder command module 100. An AFM status signal 102 may be generated and sent to the coordination control module 24.

The transmission control module 54 operates the transmission 32, and generates a vehicle speed signal 104. The transmission control module 54 sends the vehicle speed signal 104 to the coordination control module 24. The coordination control module 24 may, for example, estimate a distance of vehicle travel based on the vehicle speed signal 104.

The ECM 52 may adjust power output of the engine 30 based on the accelerator pedal signal 72 from the driver input module 56. The driver input module 56 may generate and send a brake command signal 106 to the brakes 34. The brakes 34 may be applied to cause vehicle deceleration. During vehicle deceleration, vehicle momentum coupled with engine inertia via the wheels 36, the driveline 92 and the transmission 32 back-drives the engine 30 via the crankshaft 90. This is referred to as engine braking and occurs when the cylinder(s) of the engine 30 (cylinder 82) are active.

The driver input module 56 may generate a driver select signal 108. The driver input module 56 may generate the driver select signal 108 based on a state of an enhanced braking switch 109. The state of the enhanced braking switch 109 may be one of ON and OFF to indicate that the enhanced braking feature over downhill driving events is activated or not activated. The enhanced braking switch 109 may indicate that the enhanced braking feature is activated when the state is ON. The enhanced braking switch 109 may also include multiple positions when the state is ON. Various degrees of downhill braking enhancement may be activated based on the multiple positions of the enhanced braking switch 109. The enhanced braking feature may be provided by re-activating cylinders during AFM when selected cylinders are deactivated. The driver select signal 108 may be sent to the coordination control module 24. The coordination control module 24 may communicate with the ECM 52 to determine re-activation of the selected cylinders.

The cylinder actuator module 62 may receive the cylinder deactivation signal 66' from the ECM 52. The cylinder actuator module 62 may perform cylinder deactivation based on the cylinder deactivation signal 66'. The cylinder actuator module 62 may deactivate selected cylinders, and allows other cylinders to be activated. In one embodiment, the cylinder actuator module 62 may receive an overriding cylinder deactivation signal 66" from a coordination control module 24.

Cylinder deactivation may include maintaining valves of a cylinder in a closed state, deactivating fuel supply to the cylinders, and/or deactivating spark to a cylinder. For example, the cylinder actuator module 62 may deactivate the cylinder 82 by preventing the intake and the exhaust valves 86, 94 from opening. The cylinder actuator module 62 may deactivate the cylinder 82 by preventing the supply of fuel to the cylinder 82. The cylinder actuator module 62 may deactivate the cylinder 82 by deactivating spark of the cylinder 82.

Figure 3:
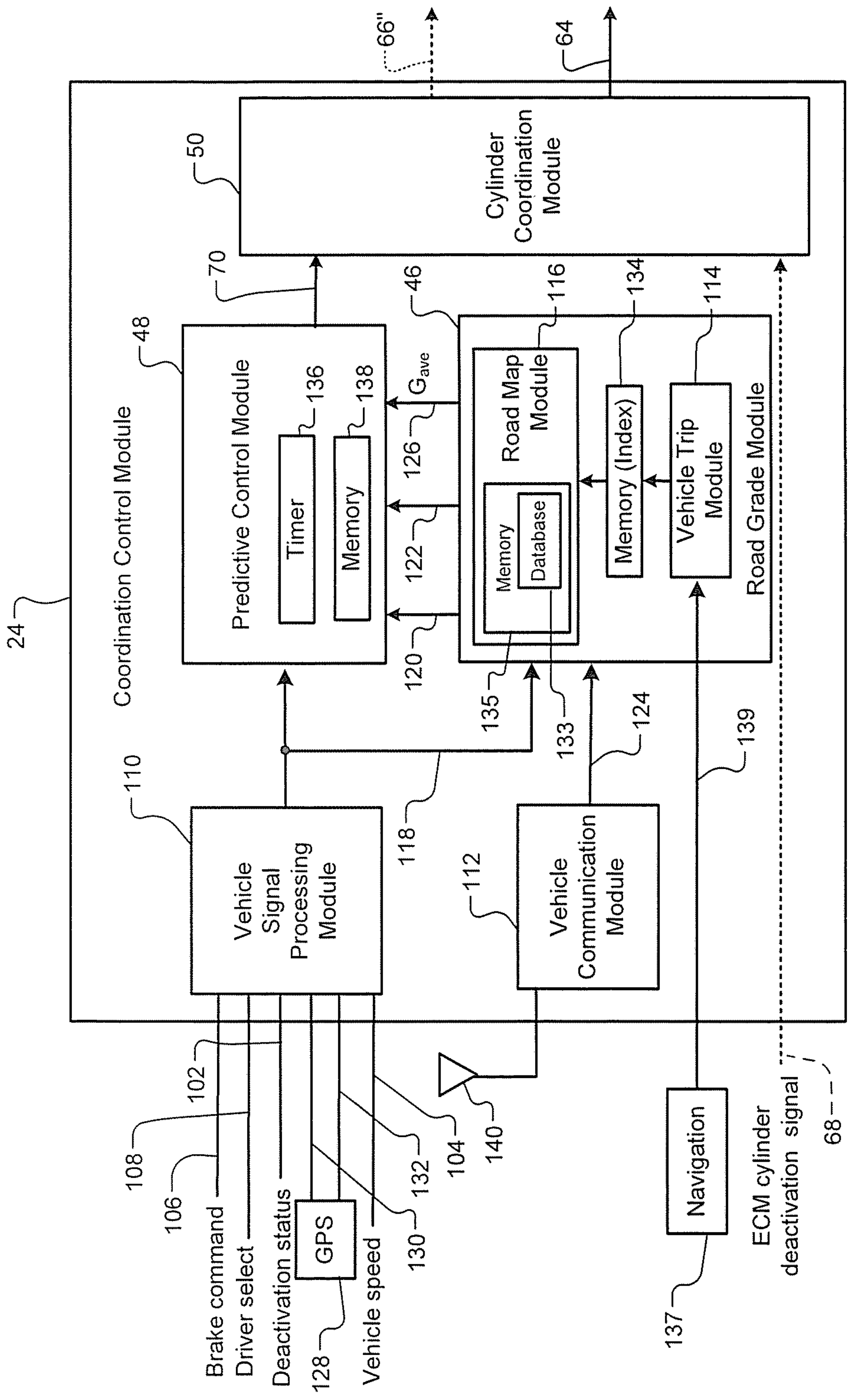
FIG. 3 is a functional block diagram of a coordination control module according to the principles of the present disclosure.

FIG. 3 shows a functional block diagram of the coordination control module 24 of FIG. 2. The coordination control module 24 may include a vehicle signal processing module 110 and a vehicle communication module 112. The coordination control module 24 also includes the road grade module 46, the predictive control module 48 and the cylinder coordination module 50.

The vehicle signal processing module 110 may receive the brake command signal 106, the driver select signal 108, the AFM status signal 102 and the vehicle speed signal 104. The vehicle signal processing module 110 may also receive a GPS vehicle position signal 130 and a GPS vehicle heading signal 132. The GPS vehicle position signal 130 and the GPS vehicle heading signal 132 may be provided by a GPS sensor module 128. The vehicle signal processing module 110 may process the received signals 102, 104, 106, 110, 130 and 132 including filtering and signal conditioning to remove noise and provide signal consistency. The vehicle signal processing module 110 generates and sends a set of processed vehicle signals 118 to the road grade module 46 and the predictive control module 48. The processed vehicle signals 118 include processed signals 102, 104, 106, 110, 130 and 132.

The vehicle communication module 112 performs wireless communication for the vehicle. The vehicle communication module 112 may receive a wireless signal from a vehicle antenna 140 and provide a vehicle communication signal 124 according to the received wireless signal. In one embodiment, the wireless communication is performed between the vehicle and a base station. In another embodiment, the wireless communication is performed between the vehicle and another vehicle. The vehicle communication module 112 may receive a map data via the wireless communication, and sends the map data to the road grade module 46.

The road grade module 46 may include a vehicle trip module 114 and a road map module 116. The road grade module 46 receives the processed vehicle signals 118 and generates a road grade signal 120 and a corresponding distance signal 122 based on the processed vehicle signals 118. The road grade module 46 may receive a vehicle communication signal 124. The road grade module 46 may also generate a road grade average signal 126 based on map data included in a digital map database 133 stored a memory 135 of the road map module 116.

The road grade module 46 detects a road grade at a predetermined distance that is ahead of a current vehicle location. The road grade module 46 may detect the road grade based on a vehicle location, a vehicle heading and the map data. The vehicle location and heading may be provided by the vehicle trip module 114. The road grade module 46 determines a planned vehicle path and detects the road grade along the planned vehicle path.

The vehicle trip module 114 generates a map index for the road map module 116. The road map module 116 may access to the digital map database 133 based on the map index. The vehicle trip module 114 may store the map index in a memory 134. The vehicle trip module 114 may generate the map index based on vehicle trip information. The vehicle trip information may include the GPS vehicle location signal 130 and the GPS vehicle heading signal 132. Additionally, a navigation system 137 may provide pre-programmed navigation signal 139 to enhance the vehicle trip information. The navigation signal 139 may include the planned vehicle path on the map, the current vehicle location with respect to the planned vehicle path and subsequent road branching points on the map.

The road map module 116 provides the map data. In one embodiment, the road map module 116 may obtain the map data from the digital map database 133 stored in memory 135. In another embodiment, the vehicle communication module 112 may obtain the map data from another vehicle or a base station wirelessly. The road map module 116 may obtain the map data from the vehicle communication module 112.

The predictive control module 48 may receive the road grade signal 120 and the corresponding distance signal 122. The predictive control module 48 may also receive the road grade average signal 126. The predictive control module 48 may generate a predictive activation signal 70 for the cylinder coordination module 50. The cylinder coordination module 50 may re-activate the cylinders based on the predictive activation signal 70. The predictive control module 48 may include a timer 136 and a memory 138. The predictive activation signal 70 may be stored in memory 138 for a period of time determined by the timer 136.

The predictive control module 48 may detect an up-coming downhill driving event that the vehicle is to travel a distance ahead of the current vehicle location. The predictive control module 48 may generate the predictive activation signal 70 when the downhill driving event is detected. The predictive control module 48 may generate the predictive activation signal 70 based on the road grade signal 120 and the corresponding distance signal 122.

In one embodiment, the predictive control module 48 may generate the predictive activation signal 70 based on a status of wheel brake application. The status of wheel brake application may be one of "applied" or "not applied". The status may be detected using the brake command signal 106.

Figure 4A:
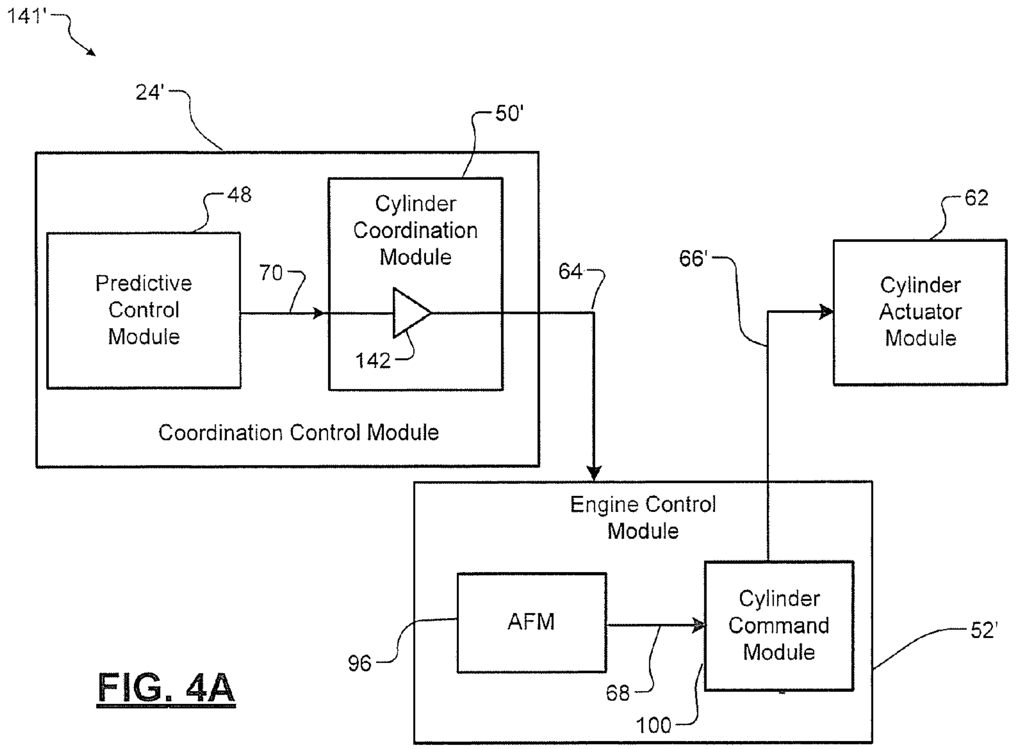
FIG. 4A is a functional block diagram of an enhanced braking control system with cylinder deactivation signal generated by an engine control module according to the principles of the present disclosure.

Referring now also to FIG. 4A, a functional block diagram of an engine control system 141' for enhanced braking is shown. In this engine control system 141', the cylinder deactivation signal 66' is generated by an ECM 52'. The engine control system 141' includes a coordination control module 24', the ECM 52' and the cylinder actuator module 62 in FIG. 2. The coordination control module 24' also includes the predictive control module 48 in FIG. 2 and a cylinder coordination module 50'. The ECM 52' includes the AFM module 96 and the cylinder command module 100 in FIG. 2.

The predictive control module 48 determines the predictive activation signal 70 for cylinder re-activation. The predictive activation signal 70 is passed through a buffer 142 to generate the re-activation request signal 64 to request for activation of the deactivated cylinders. The ECM 52' generates the cylinder deactivation signal 66' based on the re-activation request signal 64 and the AFM cylinder signal 68 generated by the AFM module 96. The cylinder command module 100 may determine a deactivation command based on the AFM cylinder signal 68, and generates the cylinder deactivation signal 66' according to the deactivation command. The cylinder deactivation signal 66' is sent to the cylinder actuator module 62 by the ECM 52'.

Figure 4B:
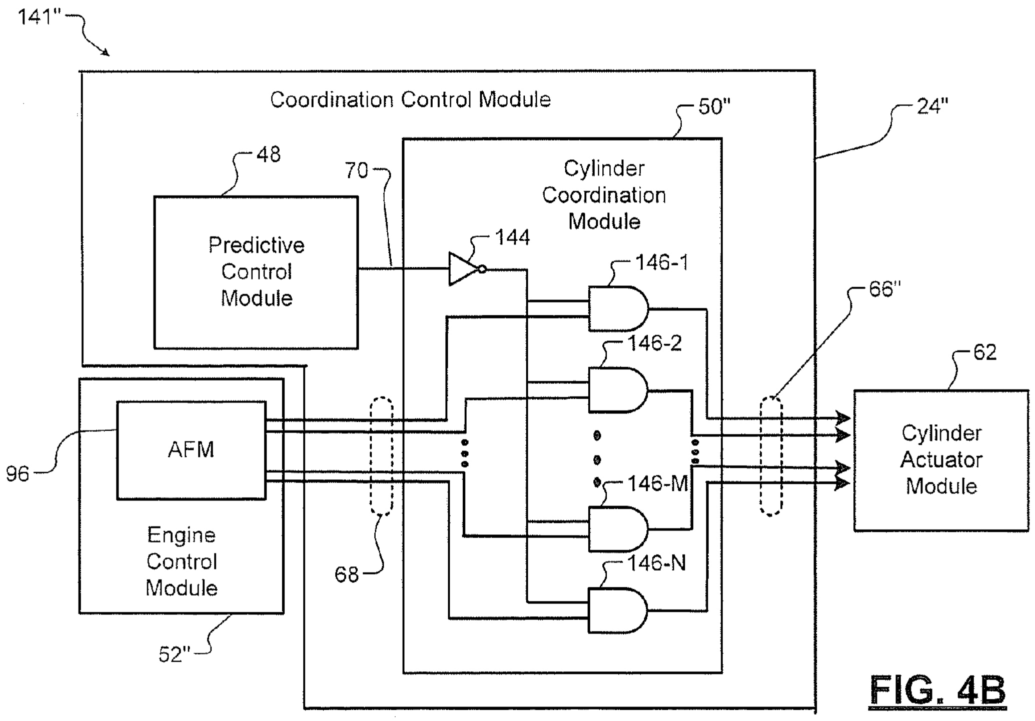
FIG. 4B is a functional block diagram of an enhanced braking control system with cylinder deactivation signal generated by a cylinder coordination module according to the principles of the present disclosure.

FIG. 4B shows a functional block diagram of an engine control system 141" of enhanced braking. In this engine control system 141", the cylinder deactivation signal 66" is generated by a cylinder coordination module 50". The engine control system 141" includes a coordination control module 24", an ECM 52" and the cylinder actuator module 62 in FIG. 2. The coordination control module 24" includes the predictive control module 48 in FIG. 2 and the cylinder coordination module 50". The ECM 52" includes the AFM module 96 in FIG. 2. The AFM module 96 generates the AFM cylinder signal(s) 68 to selectively deactivate cylinders. The predictive control module 48 generates the predictive activation signal 70 for activating deactivated cylinders. The cylinder coordination module 50" generates a cylinder deactivation signal 66" based on the predictive activation signal 70 and the AFM cylinder signal 68. The cylinder deactivation signal 66" is sent to the cylinder actuation module 62.

The AFM cylinder signal 68 may include a set of deactivation command signals corresponding to each selected cylinder to be deactivated. For illustrative purposes only, the AFM cylinder signal(s) 68 may have a level associated with TRUE for the cylinders to be deactivated, and a level associated with FALSE for the cylinders not to be deactivated. The predictive activation signal 70 may have a level associated with TRUE to re-activate the cylinders, and a level associated with FALSE not to re-activate the cylinders. The cylinder actuator module 62 deactivates a cylinder when the corresponding cylinder deactivation signal has a value of TRUE. In this control system 141", the predictive activation signal 70 is first negated by a logic inverter 144 and then sent to a set of logical AND gates 146. Each of the logical AND gates 146 receives the negated predictive activation signal 70, and performs a logical AND operation with the AFM cylinder signal 68 for a respect one of the cylinders. The cylinder coordination module 50" generates and sends the cylinder deactivation signal 66" to the cylinder actuator module 62.

Figure 5:
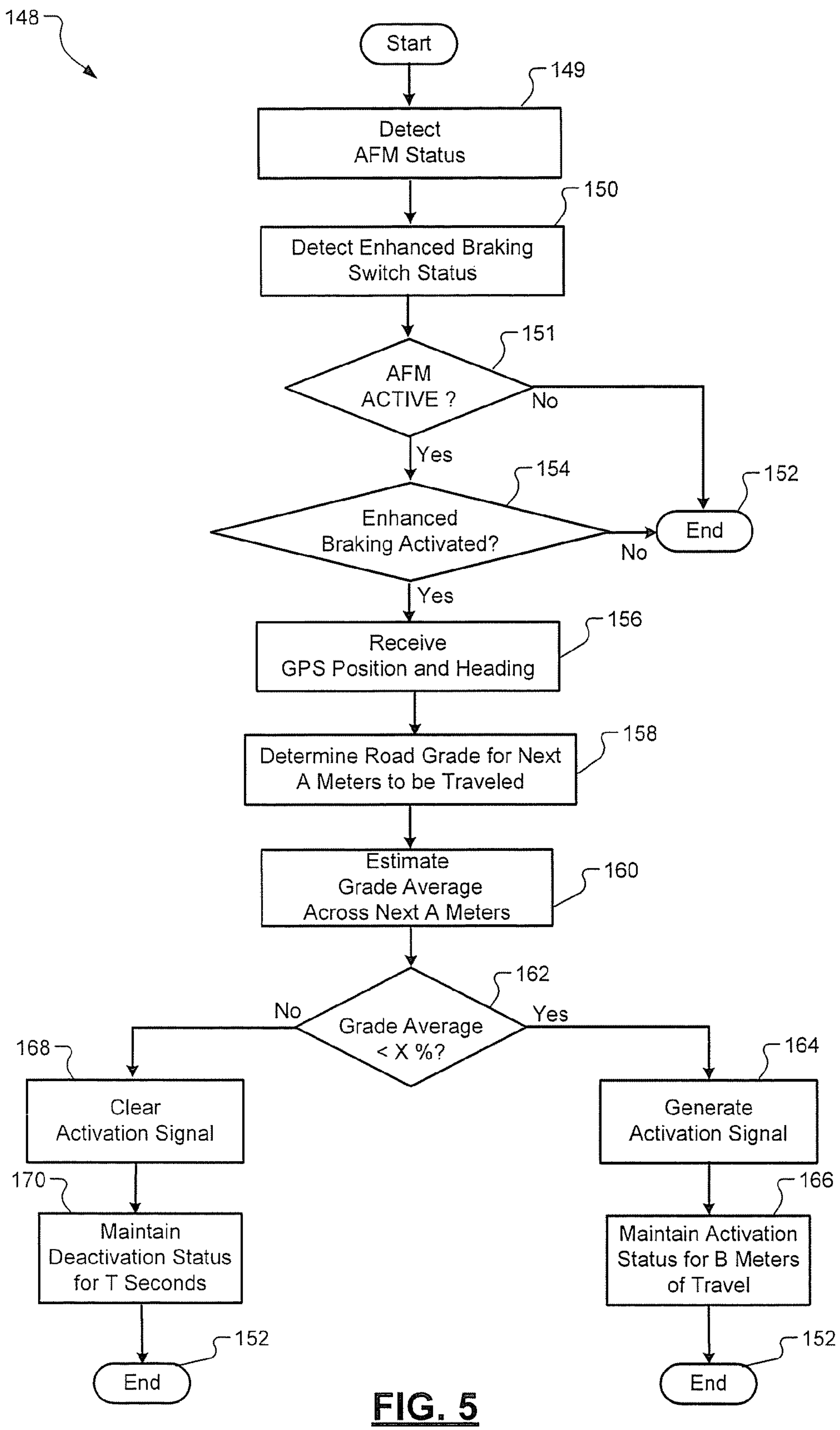
FIG. 5 illustrates a distance-based method according to the principles of the present disclosure.

Referring now also to FIG. 5, an exemplary distance-based method 148 is shown. Although the method is primarily described with respect to FIGS. 1-4A, the method may apply to other embodiments of the present disclosure. The method 148 includes generation of the predictive activation signal 70. The predictive activation signal 70 is generated and a cylinder(s) is activated for a predetermined activation distance. The cylinder is activated until the vehicle travels over the activation distance. The cylinder may be enabled to be re-deactivated after the predetermined distance of vehicle travel. The cylinder may be enabled to be re-deactivated when, for example, the vehicle travels on a level ground after a downhill driving event. Control of the coordination control module 24 may execute the following steps associated with the method 148.

In step 149, the coordination control module 24 may detect an AFM status generated by the AFM module 96 and stored in memory 98. The AFM status may be detected via the AFM status signal 102. The AFM status may indicate deactivation of selected cylinders when the AFM status is ACTIVE. The cylinders are activated when the AFM status is INACTIVE. In one embodiment, none of the cylinders are deactivated when the AFM status is INACTIVE.

In step 150, the coordination control module 24 may also detect a status of the enhanced braking switch 109. The status of the enhanced braking switch 109 may be one of ON and OFF. The status of the enhanced braking switch 109 may be detected via the driver select signal 108 generated by the driver input module 56. An enhanced braking feature over downhill driving events may be performed using cylinder re-activation when the status of the enhanced braking switch 109 is ON. Enhanced braking may include cylinder re-activation to override the deactivation the selected cylinders when the AFM status is ACTIVE.

In step 151, the control proceeds to step 152 to end when the AFM status signal 102 indicates an INACTIVE. The control proceeds to step 154 when the AFM status signal 102 indicates an ACTIVE.

In step 154, the control proceeds to step 152 to end when the status of the enhanced braking switch 109 is OFF. The control proceeds to step 156 when the status of the enhanced braking switch 109 is ON.

In step 156, the coordination control module 24 may receive the GPS vehicle position signal 130 and the GPS vehicle heading signal 132. The GPS vehicle position signal 130 and vehicle heading signal 132 may be provided by the GPS sensor module 128. The signals may be processed by the vehicle signal processing module 110.

In step 158, the coordination control module 24 determines a road grade for next A meters of vehicle travel, referred to as a grade-averaging distance $D_{grade\text{-}ave}$. In one embodiment, A may be 100. The coordination control module 24 may access the digital map database 133 stored in memory 135 to determine the road grade. The digital map database 133 may be accessed using the map index stored in memory 134.

The vehicle trip module 114 may identify a map index based on the GPS vehicle position signal 130. The road map data may include a road identity such as route number of a highway, a path to be traveled over the road and road elevations along the path. In one embodiment, the road information may also include curvature, speed limit or type of road including gravel or paved roads, and a directional indication of the road (e.g. a one-way road).

The road grade may be determined according to the map index. A set of map indexes may be generated based on vehicle location and heading determined based on the GPS vehicle position signal 130 and vehicle heading signal 132, respectively. Vehicle heading may be used to determine which part of the road on the map is ahead of the vehicle. The vehicle heading may be determined using the GPS vehicle heading signal when GPS signals are available. Alternative methods may be used when the GPS signals are unavailable, for example, due to a fault of a GPS signal receiver or due to environmental constraints such as inside a tunnel. For example, vehicle heading may be determined based on map data when the map data indicates a one-way direction of the road. In another embodiment, vehicle heading may be determined based on a set of past vehicle locations compared with a present vehicle position. Still in another embodiment, vehicle heading may be determined based on vehicle navigation data indicating a set of predetermined locations on a planned path compared with the present vehicle location.

Road grade at a predetermined distance ahead of the vehicle may be determined using map data of road elevation in conjunction with the map index obtained based on vehicle location and vehicle heading. The road grade module 46 may generate the road grade signal 120 based on distances within the grade-averaging distance $D_{grade\text{-}ave}$. Distance signal 122 corresponding to the distance data may be generated by the road grade module 46.

The road grade module 46 may determine a road grade based on road elevation data, for example, using equation 1, $$Grad(k) = \frac{Elev(k2) - Elev(k1)}{Dist(k2) - Dist(k1)} * 100\% \tag{1}$$

Parameters k1 and k2 are map indices, with k1 corresponding to a location closer to the vehicle than a location corresponding to k2. Grad(k) is a road grade estimation between road locations indexed by k1 and k2. Elev(k1) and Elev(k2) are road elevation data at locations corresponding to the indices k1 and k2. Dist(k1) and Dist(k2) are estimated distances from a current vehicle location to the locations corresponding to the indices k1 and k2.

Equation 1 shows a method of estimating a road grade at a distance Dist(k) ahead of a current vehicle location. The distance Dist(k) may be calculated, for example, using equation 2:

$$Dist(k) = \frac{Dist(k1) + Dist(k2)}{2} \tag{2}$$

The road grade module 46 may generate a series of data pairs of {Grad(1), Dist(1)}, {Grad(2), Dist(2)} . . . {Grad(N), Dist (N)} using equations 1 and 2 at various distances from the current vehicle location. Each one of the data pairs {Grad(1), Dist(1)}, {Grad(2), Dist(2)} . . . {Grad(N), Dist(N)} represents a road grade and a corresponding distance based on road elevation and distance data generated by the road map module 116.

Equations 1 and 2 show a first-order method for estimating road grade and distance. A method using an Xth-order estimation technique may be used, where X is an integer greater than 1.

In step 160, the road grade module 46 estimates a grade average over the grade-averaging distance $D_{grade-ave}$. The road grade module 46 may use equations 1 and 2 to generate a series of data set {Grad(1), Dist(1)}, {Grad(2), Dist(2)} . . . {Grad(N), Dist(N)}, for distances Dist(j) within the grade-averaging distance $D_{grade-ave}$, that is, for those distances where $$0 < \mathrm{Dist}(j) < D_{grade-ave} \tag{3}$$

The road grade module 46 may determine the road grade average $G_{ave}$ within the grade averaging distance, for example, using equation 4, $$G_{ave} = \frac{\sum_{j=1}^{N} Grad(j)}{N} \tag{4}$$

N is a number of data points used in equation 4 to compute the road grade average $G_{ave}$.

In step 162, the predictive control module 48 may determine a condition to re-activate the deactivated cylinders. The condition may be determined based on the road grade average $G_{ave}$. Deactivated cylinders may be re-activated when the road grade average $G_{ave}$ is below a predetermined grade threshold of X %. The grade threshold may be minus 4.0 percent (−4%) for illustrative purpose. A downhill slope has a negative road grade value, and an uphill slope has a positive road grade value. For example when a road grade is below minus 4 percent (−4%), the road may be referred to as having a "downhill slope greater than 4%". On the other hand, when a road grade is above 5 percent (5%), the road may be referred to as having an "uphill slope greater than 5%".

In one embodiment, cylinders may be re-activated when a road grade is more negative than a slope threshold of X % during a downhill driving event. In another embodiment, cylinders may be activated when an uphill slope is greater than a slope threshold of X % during an uphill driving event.

The predictive control module 48 may also determine the condition to re-activate the deactivated cylinders based on a status of the enhanced braking switch 109. In one embodiment, cylinders may be re-activated when the vehicle is traveling over a downhill slope and the downhill slope exceeds a predetermined slope threshold as long as the status of the enhanced braking switch is ON. In another embodiment, a status of wheel brake application is also considered for cylinder re-activation when the status of the enhanced braking status is ON. The status of wheel brake application may be one of "brake applied" and "brake not applied". The predictive control module 48 may determine the status of wheel brake application based on the brake command signal 106. The predictive control module 48 may re-deactivate the cylinders when the brake 34 is not applied after the cylinders are activated.

In step 164, the predictive control module 48 generates the predictive activation signal 70 to re-activate the deactivated cylinders. In step 166, the re-activated cylinders are maintained in an activated state for a duration of B meters of vehicle travel, referred to as an activation distance $D_{act}$. The activation distance $D_{act}$ is preferred to be less than the grade-averaging distance $D_{grade-ave}$. In one embodiment, B may be 90 for illustrative purpose. The control proceeds to end after the vehicle has traveled the activation distance $D_{act}$. The cylinders may be enabled to be re-deactivated after the vehicle has traveled the activation distance $D_{act}$.

In step 168, the predictive control module 48 clears the predictive activation signal 70 and allows the deactivated cylinders remain to be deactivated. In step 170, the deactivated cylinders are allowed to be in a deactivated state for a duration of T seconds. The predictive control module 48 may use the timer 136 to start a time delay for T seconds. T may be 5.0 for illustrative purpose. The control proceeds to end after the time delay has expired.

Figure 6:
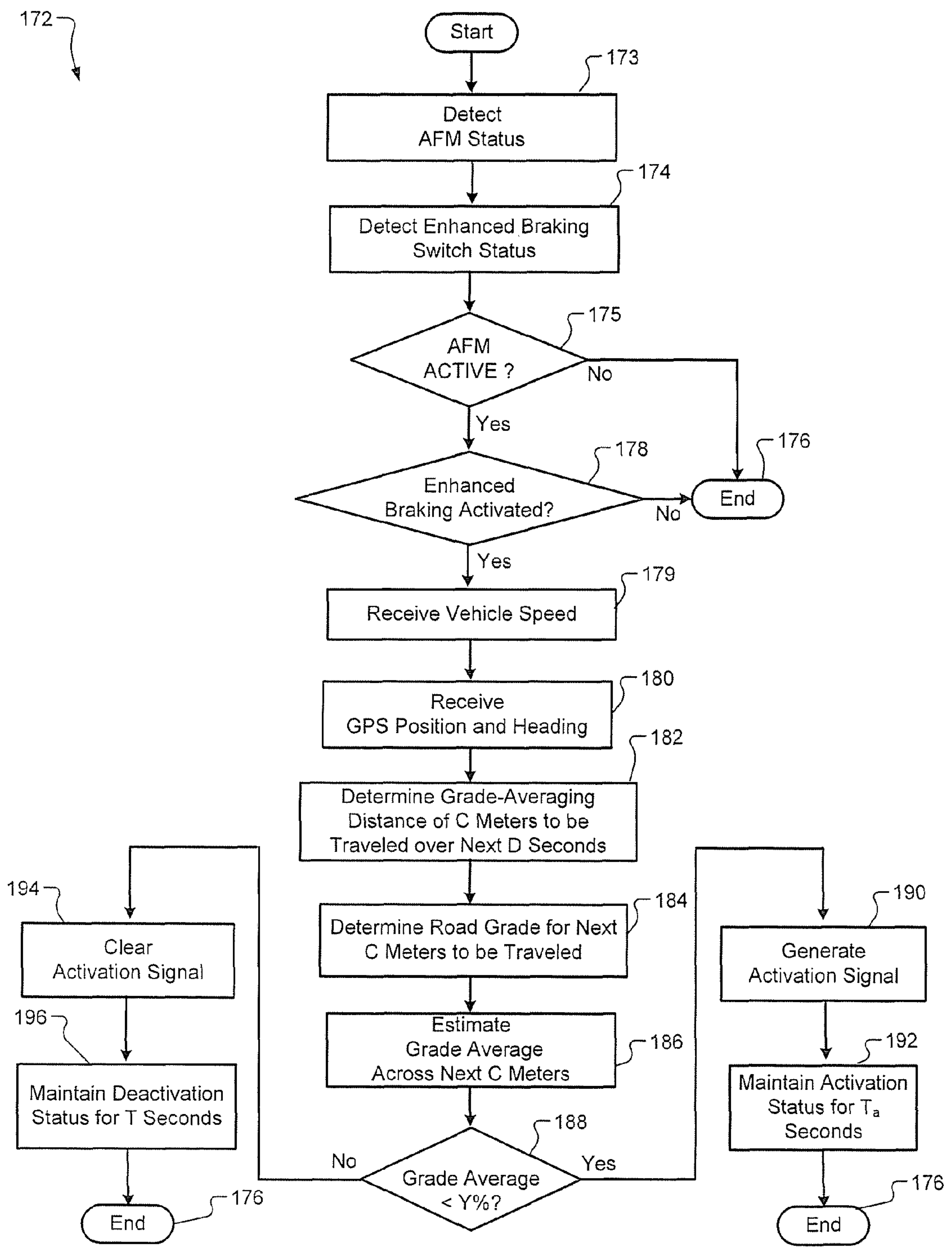
FIG. 6 illustrates a time-based method according to the principles of the present disclosure.

In FIG. 6, an exemplary time-based method 172 is illustrated. Although the method is primarily described with respect to FIGS. 1-4A, the method may apply to other embodiments of the present disclosure. The method 172 includes generation of the predictive activation signal 70. The predictive activation signal 70 is generated to activate a cylinder. The activated cylinder is maintained in an activated state for an activation period. The cylinder is activated until the activation period expires. Control of the coordination control module 24 may execute the following steps associated with the method 172.

In step 173, the coordination control module 24 may detect an AFM status generated by the AFM module 96 and stored in memory 98. The AFM status may be detected via the AFM status signal 102. The AFM status may indicate deactivation of selected cylinders when the AFM status is ACTIVE. The cylinders are activated when the AFM status is INACTIVE. In one embodiment, none of the cylinders are deactivated when the AFM status is INACTIVE.

In step 174, the coordination control module 24 may also detect a status of the enhanced braking switch 109. The status of the enhanced braking switch 109 may be one of ON and OFF. The status of the enhanced braking switch 109 may be detected via the driver select signal 108 generated by the driver input module 56. An enhanced braking feature over downhill driving events may be performed using cylinder re-activation when the status of the enhanced braking switch 109 is ON. Enhanced braking may include cylinder re-activation to override the deactivation the selected cylinders when the AFM status is ACTIVE.

In step 175 the control proceeds to step 176 to end when the AFM status signal 102 indicates an INACTIVE. The control proceeds to step 178 when the AFM status signal 102 indicates an ACTIVE.

In step 178, the control proceeds to step 176 to end when the status of the enhanced braking switch 109 is OFF. The control proceeds to step 179 when the status of the enhanced braking switch 109 is ON.

In step 179, the coordination control module 24 determines a vehicle speed V. The vehicle speed V may be determined based on the vehicle speed signal 104. In step 180, the coordination control module 24 receives the GPS vehicle position signal 130 and the GPS vehicle heading signal 132. The GPS vehicle position signal 130 and vehicle heading signal 132 may be provided by the GPS sensor module 128. The signals may be processed by the vehicle signal processing module 110.

In step 182, the road grade module 46 determines a grade-averaging distance $D_{grade\text{-}ave}$ of C meters. The grade-averaging distance $D_{grade\text{-}ave}$ is determined based on a predetermined time period, referred to as a grade-averaging period $T_{grade\text{-}ave}$ of D seconds. In one embodiment, D may be 5.0 for illustrative purpose. A value C (in meters) of the grade-averaging distance $D_{grade\text{-}ave}$ may be determined using the vehicle speed V (in meters per second) and the grade-averaging period $T_{grade\text{-}ave}$ (in seconds), for example, by equation 5, $$C=T_{grade\text{-}ave}*V \quad (5)$$

In step 184, the road grade module 46 determines road grades a distance ahead of a current vehicle location. The road grades may be determined using a similar method disclosed in step 158 in FIG. 5.

In step 186, the road grade module 46 estimates a road grade average $G_{ave}$ within the grade-averaging distance $D_{grade\text{-}ave}$ using a similar method disclosed in step 160 in FIG. 5. Equations 1-4 may be used to determine the road grade average $G_{ave}$ within the grade-averaging distance $D_{grade\text{-}ave}$ of C meters.

In step 188, the road grade module 46 determines a condition to re-activate the deactivated cylinders. The condition may be determined using a similar method disclosed in step 162 in FIG. 5. For example, the cylinder may be re-activated when the road grade average $G_{ave}$ is below a predetermined threshold of Y %. Y may be −4.0 for illustrative purpose.

In step 190, the predictive control module 48 generates the predictive activation signal 70 to re-activate the deactivated cylinders. In step 192, the activated cylinders are maintained in an activated state for a period of $T_a$ seconds, referred to as an activation period $T_{act}$. The activation period $T_{act}$ is preferred to be shorter than the grade-averaging period $T_{grade\text{-}ave}$. In one embodiment, $T_a$ may be 4.5 for illustrative purpose. The predictive control module 48 may use the timer 136 to implement a time duration of the activation period $T_{act}$. The control proceeds to end when the time delay has expired.

In step 194, the predictive control module 48 clears the predictive activation signal 70 to allow the deactivated cylinders remain to be deactivated. In step 196, the deactivated cylinders are allowed to be in a deactivated state for a duration of T seconds. The predictive control module 48 may use the timer 136 to start a time delay for T seconds. T may be 5.0 for illustrative purpose. The control proceeds to end when the time delay has expired.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system of a vehicle comprising:
a road grade module that detects a grade of a road that is ahead of the vehicle; and
a predictive control module that detects that a first cylinder of an engine of the vehicle is deactivated while a second cylinder of the engine is activated and that activates the first cylinder when the grade is a downhill grade,
wherein deactivating a cylinder includes disabling operation of valves of the cylinder, disabling fuel supply to the cylinder, and disabling spark in the cylinder, and activating a cylinder includes enabling operation of valves of the cylinder, enabling fuel supply to the cylinder, and enabling spark in the cylinder.

2. The engine control system of claim 1 further comprising a cylinder command module that prevents an intake valve and an exhaust valve of the first cylinder from opening when the first cylinder is deactivated.

3. The engine control system of claim 1, wherein the predictive control module determines a magnitude of the grade, and activates the first cylinder when the magnitude exceeds a slope threshold.

4. The engine control system of claim 1, wherein the predictive control module determines an activation time period based on the grade, and activates the first cylinder for the activation time period.

5. The engine control system of claim 1, wherein the predictive control module determines an activation distance of travel of the vehicle based on the grade, and activates the first cylinder for the activation distance.

6. The engine control system of claim 1 further comprising a GPS sensor that generates a vehicle position signal for detecting the grade.

7. The engine control system of claim 1 further comprising a GPS sensor that generates a vehicle heading signal for detecting the grade.

8. The engine control system of claim 1 further comprising a road map module that comprises a digital map database,
wherein the road map module generates a map signal based on data in the digital map database and detects the grade based on the map signal.

9. The engine control system of claim 1 further comprising a vehicle communication module that wirelessly receives a grade signal from at least one of another vehicle and a base station,
wherein the road grade module detects the grade based on the grade signal.

10. The engine control system of claim 1, wherein deactivating a cylinder includes disabling fuel supply to the cylinder during an intake stroke of the cylinder and activating a cylinder includes enabling fuel supply to the cylinder during the intake stroke of the cylinder.

11. A method of operating an engine control system of a vehicle comprising:
detecting a grade of a road that is ahead of the vehicle;
detecting that a first cylinder of an engine of the vehicle is deactivated while a second cylinder of the engine is activated; and
activating the first cylinder when the grade is a downhill grade,
wherein deactivating a cylinder includes disabling operation of valves of the cylinder, disabling fuel supply to the cylinder, and disabling spark in the cylinder, and activating a cylinder includes enabling operation of valves of the cylinder, enabling fuel supply to the cylinder, and enabling spark in the cylinder.

12. The method of claim 11, wherein an intake valve and an exhaust valve of the first cylinder are prevented from opening when the first cylinder is deactivated.

13. The method of claim 11 further comprising determining a magnitude of the grade, wherein the first cylinder is activated when the magnitude exceeds a slope threshold.

14. The method of claim 11, wherein the first cylinder is activated for a predetermined time period, and wherein the first cylinder is re-deactivated after the predetermined time period.

15. The method of claim 11, wherein the first cylinder is activated for a predetermined distance of vehicle travel, and wherein the first cylinder is enabled to be re-deactivated after the predetermined distance of vehicle travel.

16. The method of claim 11 further comprising:

generating a vehicle position signal; and detecting the grade based on the vehicle position signal.

17. The method of claim 11 further comprising:

generating a vehicle heading signal; and detecting the grade based on the vehicle heading signal.

18. The method of claim 11 further comprising:

accessing a map database stored in memory;

generating a map signal based on data in the map database; and determining the grade based on the map signal.

19. The method of claim 11 further comprising:

wirelessly receiving a grade signal from at least one of another vehicle and a base station; and detecting the grade based on the grade signal.

20. The method of claim 11, wherein deactivating a cylinder includes disabling fuel supply to the cylinder during an intake stroke of the cylinder and activating a cylinder includes enabling fuel supply to the cylinder during the intake stroke of the cylinder.

* * * * *